United States Patent
Oswald et al.

(10) Patent No.: US 6,907,335 B2
(45) Date of Patent: Jun. 14, 2005

(54) METHOD FOR CLASSIFYING AN OBSTACLE BY MEANS OF PRE-CRASH SENSOR SIGNALS

(75) Inventors: Klaus Oswald, Wendlingen (DE); Michael Roelleke, Leonberg-Hoefingen (DE); Rainer Moritz, Filderstadt (DE); Gerhard Loeckle, Ludwigsburg (DE); Armin Koehler, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/362,251

(22) PCT Filed: Jun. 15, 2002

(86) PCT No.: PCT/DE02/02189

§ 371 (c)(1),
(2), (4) Date: Jun. 17, 2003

(87) PCT Pub. No.: WO03/004317

PCT Pub. Date: Jan. 16, 2003

(65) Prior Publication Data

US 2004/0030476 A1 Feb. 12, 2004

(30) Foreign Application Priority Data

Jul. 5, 2001 (DE) .......................................... 101 32 681

(51) Int. Cl.⁷ ................................................ G06F 7/00
(52) U.S. Cl. ......................................................... 701/45
(58) Field of Search ...................... 701/45, 47; 342/42, 342/69–72; 340/425.5, 435, 436

(56) References Cited

U.S. PATENT DOCUMENTS

| | | | | |
|---|---|---|---|---|
| 6,012,008 A | * | 1/2000 | Scully | .......................... 701/45 |
| 6,169,945 B1 | | 1/2001 | Bachmaier | |
| 6,420,996 B1 | * | 7/2002 | Stopczynski et al. | ......... 342/70 |

FOREIGN PATENT DOCUMENTS

| | | |
|---|---|---|
| DE | 197 36 840 | 2/1999 |
| DE | 197 41 631 | 3/1999 |
| DE | 198 03 068 | 7/1999 |
| DE | 199 38 891 | 2/2001 |
| DE | 199 46 407 | 4/2001 |
| DE | 199 49 409 | 4/2001 |
| EP | 0 728 624 | 8/1996 |
| EP | 0 950 583 | 10/1999 |

* cited by examiner

*Primary Examiner*—Yonel Beaulieu
(74) *Attorney, Agent, or Firm*—Kenyon & Kenyon

(57) ABSTRACT

A method of classifying an obstacle on the basis of pre-crash sensor signals is described, acceleration and acceleration change being determined from the obstacle velocity, and the obstacle is classified on the basis of these parameters. The deployment algorithm is tightened as a function of this classification; if appropriate, restraining means are deployed at an early stage and an automatic braking and/or steering intervention takes place.

8 Claims, 1 Drawing Sheet

METHOD FOR CLASSIFYING AN OBSTACLE BY MEANS OF PRE-CRASH SENSOR SIGNALS

BACKGROUND INFORMATION

The placement of radar sensors in side doors of a motor vehicle in order to determine the velocity of an obstacle by using these radar sensors as pre-crash sensors is known from German Patent Application No. 198 03 068. This makes it possible to determine an ideal point in time for the deployment of side airbags.

SUMMARY OF THE INVENTION

The method according to the present invention of classifying an obstacle on the basis of pre-crash sensor signals has the advantage over the related art of making an improved obstacle classification possible by considering parameters such as obstacle velocity, acceleration, and acceleration change. This makes optimum utilization of restraining means possible since, by considering these parameters, a more accurate estimation with regard to the type of a probable obstacle is possible.

It is particularly advantageous that the deployment algorithm for the restraining means has an improved deployment performance due to the improved obstacle classification, which makes an ideal point in time for deployment of the restraining means possible. It is an additional advantage that the obstacle classification makes an automatic braking or steering intervention possible which is decided on the basis of different stored data. This may then contribute to an accident avoidance.

Furthermore, it is an advantage that active pedestrian protection is possible due to the improved obstacle classification, since a pedestrian is identifiable as an obstacle, and thus restraining means, for example, which are attached to the outer shell of the vehicle, such as a pedestrian airbag, may be optimally deployed.

Finally, it is also an advantage that a device for the implementation of the method according to the present invention is provided which has a processor for the implementation of the method according to the present invention and which may be connected to an actuator for the steering or braking interventions and to the pedestrian protection means, i.e., the outer airbags.

DETAILED DESCRIPTION

The severity of an accident caused by an impact is determined by the type and the velocity of obstacles. According to the present invention, an obstacle is classified on the basis of pre-crash sensor signals by determining the obstacle velocity, acceleration, and acceleration change. An ideal point in time for the deployment of restraining means and the utilization of pedestrian protection means or an active intervention in the driving operation are thus ultimately possible for accident avoidance.

Figure 1:
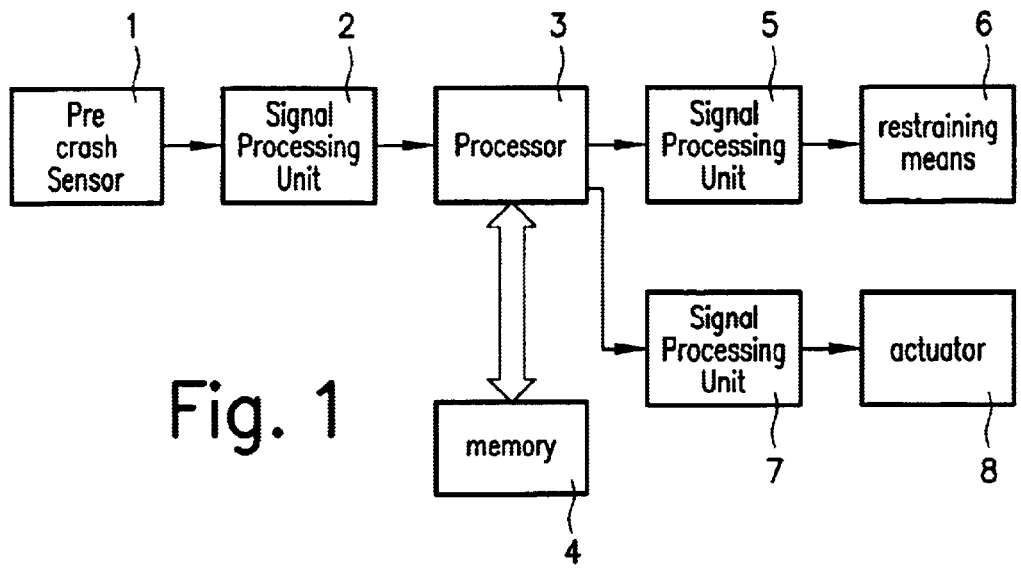
FIG. 1 shows a block diagram of a device according to the present invention.

FIG. 1 shows the device according to the present invention in a block diagram. A pre-crash sensor 1 is connected to a data input of a signal processing unit 2. Signal processing unit 2 is connected to a processor 3 via a data output. Processor 3 is connected to a memory 4 via a data input/output. Processor 1 is connected to a signal processing unit 5 via a first data output. Processor 3 is connected to a signal processing unit 7 via a second data output. The data output of signal processing unit 5 is connected to restraining means 6. The data output of signal processing unit 7 is connected to an actuator 8. Actuator 8 is used for active interventions in the driving operation, i.e., steering intervention and/or braking intervention.

A radar sensor is used here as a pre-crash sensor transmitting and receiving electromagnetic radiation in the millimeter range. It is also possible to use an ultrasonic sensor or a video sensor instead of a radar sensor. It is also possible to utilize a plurality of such sensors, or even a combination of different sensors.

Data from radar sensor 1, which outputs a digital data stream which in turn is pre-processed for processor 3 by signal processing unit 2, enables processor 3 to determine the velocity of the obstacle. The relative velocity between the obstacle and the vehicle is determinable from the pre-crash sensor signals. By knowing the velocity of the vehicle itself, the velocity of the obstacle toward the vehicle is now determinable. After an obstacle has been detected by the vehicle, the pre-crash sensor may track its further motion, i.e., a tracking of the object takes place. The tracking data may then be used for the classification of the object. By considering the vehicle velocity, the object velocity and its change over time, i.e., the acceleration, may be determined. The acceleration of the obstacle, as well as the acceleration change of the obstacle is determinable via a derivative of the velocity of the obstacle (=object) over time. The distance traveled is determined by integration of the velocity of the obstacle.

For its calculations, processor 3 uses memory 4, in particular for storing intermediate results. If the velocity of the obstacle is zero, then it is presumably a stationary object and an impact may be avoided via a simple steering intervention, for example. At a low or non-existent velocity, a braking intervention may also take place depending on the probable braking distance.

However, if an impact is unavoidable, then appropriate restraining means, such as airbags and seat belt tensioners, may be deployed at an early stage in order to ensure passenger protection. If the velocity amounts to a maximum of up to 30 km/h and the acceleration is relatively low, then it can be assumed that the obstacle is probably a pedestrian. It is possible here to lower the velocity limit even further, since only few pedestrians are able to reach 30 km/h.

If an impact on the pedestrian can no longer be avoided, then outer airbags may be triggered for the pedestrian in order to provide optimum protection for the pedestrian and to minimize injuries.

In general, if an impact can no longer be avoided, the appropriate thresholds in the deployment algorithm for the restraining means, calculated in processor 3, are lowered in order to achieve tightening of the deployment algorithm so that, even in the case of measuring signals having a low amplitude, the deployment algorithm indicates deployment of restraining means 6.

If it has been determined that there is neither a fixed obstacle nor a pedestrian, but a vehicle, then appropriate steering interventions and/or restraining means are utilized.

Figure 2:
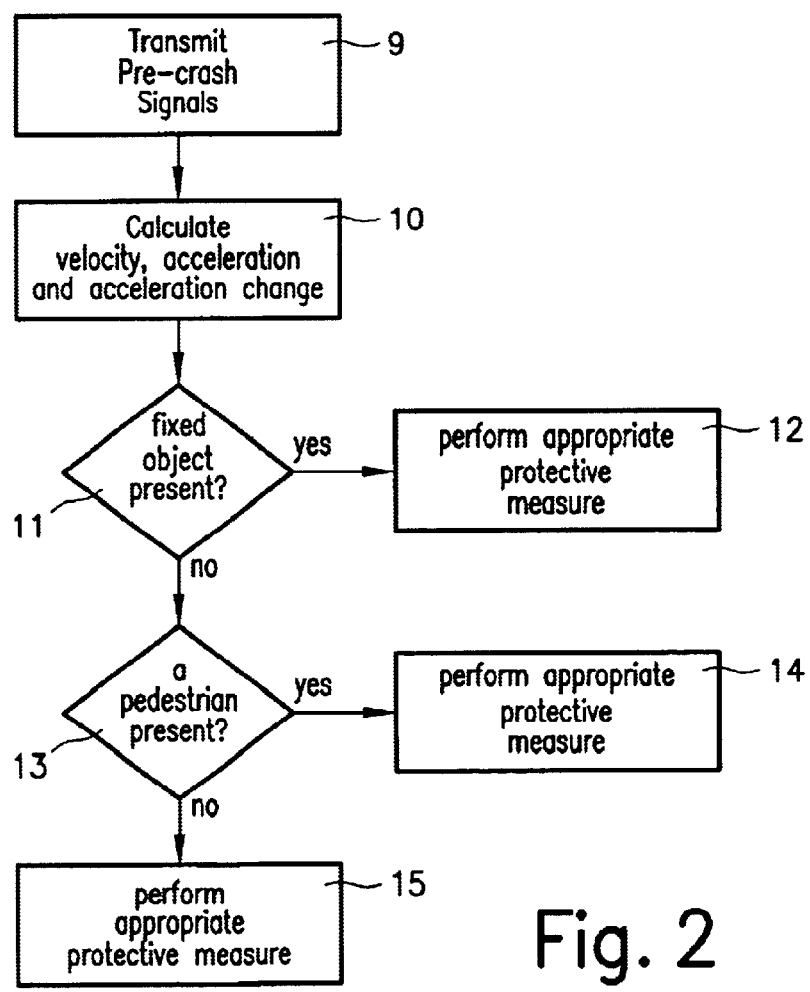
FIG. 2 shows a flowchart of the method according to the present invention.

FIG. 2 shows the method according to the present invention in a flow chart. In method step 9, the pre-crash signals are picked up by pre-crash sensor 1 and transmitted in the form of digital data to signal processing unit 2 which prepares the data for processor 3. Processor 3 calculates velocity, acceleration, and acceleration change in method step 10. The obstacle classification takes place on the basis of these parameters.

It is now checked in method step 11 whether there is a fixed object according to the obstacle classification. If this is the case, then appropriate protective measures take place in method step 12, i.e., either a steering intervention, or an early deployment of restraining means, but the deployment thresholds in the deployment algorithm are always lowered in order to achieve tightening of the deployment algorithm.

If it has been determined in method step 11 that there is no fixed object, then it is checked in method step 13 whether the obstacle classification, i.e., method step 10, has identified a pedestrian. If this is the case, then an appropriate protective measure is implemented in method step 14, i.e., either an evasion maneuver or triggering of an outer airbag.

If it has been determined in method step 13 that there is neither a pedestrian nor a fixed obstacle, but a moving object, i.e., a vehicle, then appropriate protective measures are implemented in method step 15, i.e., tightening of the deployment algorithm and, as the case may be, the early triggering of restraining means, or active interventions in the driving operation, i.e., steering interventions or braking interventions. Actuator 8 is utilized for this purpose.

What is claimed is:

1. A method of classifying an obstacle on the basis of pre-crash sensor signals, the method comprising:

determining a relative velocity between a vehicle and the obstacle from the pre-crash sensor signals;

determining an obstacle velocity from the relative velocity and a vehicle velocity;

determining an acceleration and an acceleration change from the obstacle velocity; and classifying the obstacle on the basis of the acceleration, the acceleration change and the obstacle velocity.

2. The method according to claim 1, further comprising adjusting a deployment algorithm for at least one restraining device as a function of the obstacle classification.

3. The method according to claim 2, further comprising deploying the restraining device as a function of the adjustment of the deployment algorithm prior to an impact with the obstacle.

4. The method according to claim 1, further comprising performing at least one of an automatic braking intervention and a steering intervention as a function of the obstacle classification.

5. The method according to claim 1, further comprising deploying a pedestrian protection device if the obstacle is classified as a pedestrian.

6. The method according to claim 1, further comprising providing the pre-crash sensor signals from a pre-crash sensor, wherein the relative velocity, the obstacle velocity, the acceleration and the acceleration change are determined by a processor coupled to at least one restraining device, and wherein the obstacle is classified by the processor.

7. The method according to claim 4, wherein the at least one intervention is performed by an actuator.

8. The method according to claim 6, wherein the processor is coupled to a pedestrian protection device, the pedestrian protection device being activated by the processor if the processor classifies the obstacle as a pedestrian.

* * * * *